(12) United States Patent
Zhang et al.

(10) Patent No.: US 12,067,977 B2
(45) Date of Patent: Aug. 20, 2024

(54) SPEECH RECOGNITION METHOD AND APPARATUS

(71) Applicant: BEIJING BAIDU NETCOM SCIENCE TECHNOLOGY CO., LTD., Beijing (CN)

(72) Inventors: Liao Zhang, Beijing (CN); Yinlou Zhao, Beijing (CN); Zhengxiang Jiang, Beijing (CN); Xiaoyin Fu, Beijing (CN); Wei Wei, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 297 days.

(21) Appl. No.: 17/684,681

(22) Filed: Mar. 2, 2022

(65) Prior Publication Data

US 2022/0328040 A1    Oct. 13, 2022

(30) Foreign Application Priority Data

Apr. 12, 2021   (CN) .......................... 202110390219.7

(51) Int. Cl.
  *G10L 15/183*   (2013.01)
  *G06N 5/048*   (2023.01)
(52) U.S. Cl.
  CPC ............ *G10L 15/183* (2013.01); *G06N 5/048* (2013.01)
(58) Field of Classification Search
  CPC ....... G10L 15/183; G10L 15/01; G10L 15/14; G10L 15/06; G10L 15/08; G10L 15/26;
  (Continued)

(56) References Cited

U.S. PATENT DOCUMENTS 8,521,539 B1   8/2013 Teng et al.
9,047,868 B1 *  6/2015 O'Neill ................. G10L 15/197
          (Continued)

FOREIGN PATENT DOCUMENTS

CN       106776763 A     5/2017
CN       108351876 A     7/2018
          (Continued)

OTHER PUBLICATIONS

Extended European Search Report of European application No. 22159641.4 dated Jul. 5, 2022, 5 pages.

*Primary Examiner* — Huyen X Vo
(74) *Attorney, Agent, or Firm* — Brooks Kushman P.C.

(57) ABSTRACT

The present disclosure discloses a speech recognition method and apparatus, and relates to the field of speech and deep learning technologies. A specific implementation scheme involves: acquiring candidate recognition results with first N recognition scores outputted by a speech recognition model for to-be-recognized speech, N being a positive integer greater than 1; scoring the N candidate recognition results based on pronunciation similarities between candidate recognition results and pre-collected popular entities, to obtain similarity scores of the candidate recognition results; and integrating the recognition scores and the similarity scores of the candidate recognition results to determine a recognition result corresponding to the to-be-recognized speech from the N candidate recognition results. The present disclosure can improve recognition accuracy.

18 Claims, 7 Drawing Sheets

(58) Field of Classification Search
CPC ... G10L 2015/221; G10L 15/22; G06N 5/048; G01C 21/3608; G01C 21/36
See application file for complete search history.

(56) References Cited

U.S. PATENT DOCUMENTS

| | | | |
|---|---|---|---|
| 10,388,272 | B1 | 8/2019 | Thomson et al. |
| 2006/0190258 | A1* | 8/2006 | Verhasselt ............... G10L 15/19 704/E15.021 |
| 2012/0245940 | A1* | 9/2012 | Willett .................... G10L 15/32 704/E15.011 |
| 2012/0271631 | A1* | 10/2012 | Weng ...................... G10L 15/18 704/243 |
| 2014/0163977 | A1* | 6/2014 | Hoffmeister ............ G10L 15/32 704/232 |
| 2018/0349380 | A1 | 12/2018 | Chen et al. |
| 2020/0175962 | A1 | 6/2020 | Thomson et al. |
| 2021/0034663 | A1 | 2/2021 | Aher et al. |
| 2021/0151042 | A1* | 5/2021 | Park ........................ G10L 15/02 |

FOREIGN PATENT DOCUMENTS

| | | |
|---|---|---|
| CN | 110099246 A | 8/2019 |
| CN | 110310631 A | 10/2019 |
| EP | 1189203 A2 | 3/2002 |
| JP | 2004219693 A | 8/2004 |
| JP | 2014119536 A | 6/2014 |
| WO | 2017049454 A1 | 3/2017 |

* cited by examiner

SPEECH RECOGNITION METHOD AND APPARATUS

CROSS-REFERENCE TO RELATED APPLICATIONS

The present application claims the priority of Chinese Patent Application No. 202110390219.7, filed on Apr. 12, 2021, with the title of "SPEECH RECOGNITION METHOD AND APPARATUS." The disclosure of the above application is incorporated herein by reference in its entirety.

TECHNICAL FIELD

The present disclosure relates to the field of computer application technologies, and in particular, to the field of speech and deep learning technologies.

BACKGROUND

In recent decades, a speech recognition technology has made remarkable progress and gradually enters various fields such as industry, home appliances, communications, automotive electronics, medical treatment, home services and consumer electronics. In an existing speech recognition architecture, as shown in FIG. 1, a decoder uses an acoustic model in a speech recognition model to calculate a probability from speech to syllables and a language model in the speech recognition model to calculate a probability from syllables to text, and finally outputs the text with the highest probability score as a speech recognition result.

However, in some vertical or professional speech recognition scenarios, some specific entities have low recognition accuracy due to their differences from ordinary semantic logic.

SUMMARY

In view of the above, the present disclosure provides a speech recognition method and apparatus, so as to improve the recognition accuracy.

According to a first aspect of the present disclosure, a method for speech recognition is provided, including acquiring candidate recognition results with first N recognition scores outputted by a speech recognition model for to-be-recognized speech, N being a positive integer greater than 1; scoring the N candidate recognition results based on pronunciation similarities between candidate recognition results and pre-collected popular entities, to obtain similarity scores of the candidate recognition results; and integrating the recognition scores and the similarity scores of the candidate recognition results to determine a recognition result corresponding to the to-be-recognized speech from the N candidate recognition results.

According to a second aspect of the present disclosure, an electronic device is provided, including: at least one processor; and a memory communicatively connected with the at least one processor; wherein the memory stores instructions executable by the at least one processor, and the instructions are executed by the at least one processor to enable the at least one processor to perform a method for speech recognition, wherein the method includes acquiring candidate recognition results with first N recognition scores outputted by a speech recognition model for to-be-recognized speech, N being a positive integer greater than 1; scoring the N candidate recognition results based on pronunciation similarities between candidate recognition results and pre-collected popular entities, to obtain similarity scores of the candidate recognition results; and integrating the recognition scores and the similarity scores of the candidate recognition results to determine a recognition result corresponding to the to-be-recognized speech from the N candidate recognition results.

According to a third aspect of the present disclosure, there is provided a non-transitory computer readable storage medium with computer instructions stored thereon, wherein the computer instructions are used for causing a computer to perform a method for speech recognition, wherein the method includes: acquiring candidate recognition results with first N recognition scores outputted by a speech recognition model for to-be-recognized speech, N being a positive integer greater than 1; scoring the N candidate recognition results based on pronunciation similarities between candidate recognition results and pre-collected popular entities, to obtain similarity scores of the candidate recognition results; and integrating the recognition scores and the similarity scores of the candidate recognition results to determine a recognition result corresponding to the to-be-recognized speech from the N candidate recognition results.

As can be seen from the above technical solutions, on the basis of acquiring recognition scores of candidate recognition results from a speech recognition model, pronunciation similarities between candidate recognition results and pre-collected popular entities are integrated into scores of candidate results, and a final recognition result is determined by integrating the scores and entity scores, so that the final recognition result can be as similar as possible in pronunciation to the popular entities, so as to improve the recognition accuracy.

It should be understood that the content described in this part is neither intended to identify key or significant features of the embodiments of the present disclosure, nor intended to limit the scope of the present disclosure. Other features of the present disclosure will be made easier to understand through the following description.

BRIEF DESCRIPTION OF THE DRAWINGS

The accompanying drawings are intended to provide a better understanding of the solutions and do not constitute a limitation on the present disclosure. In the drawings.

DETAILED DESCRIPTION

Exemplary embodiments of the present disclosure are illustrated below with reference to the accompanying drawings, which include various details of the present disclosure to facilitate understanding and should be considered only as exemplary. Therefore, those of ordinary skill in the art should be aware that various changes and modifications can be made to the embodiments described herein without departing from the scope and spirit of the present disclosure. Similarly, for clarity and simplicity, descriptions of well-known functions and structures are omitted in the following description.

Figure 2:
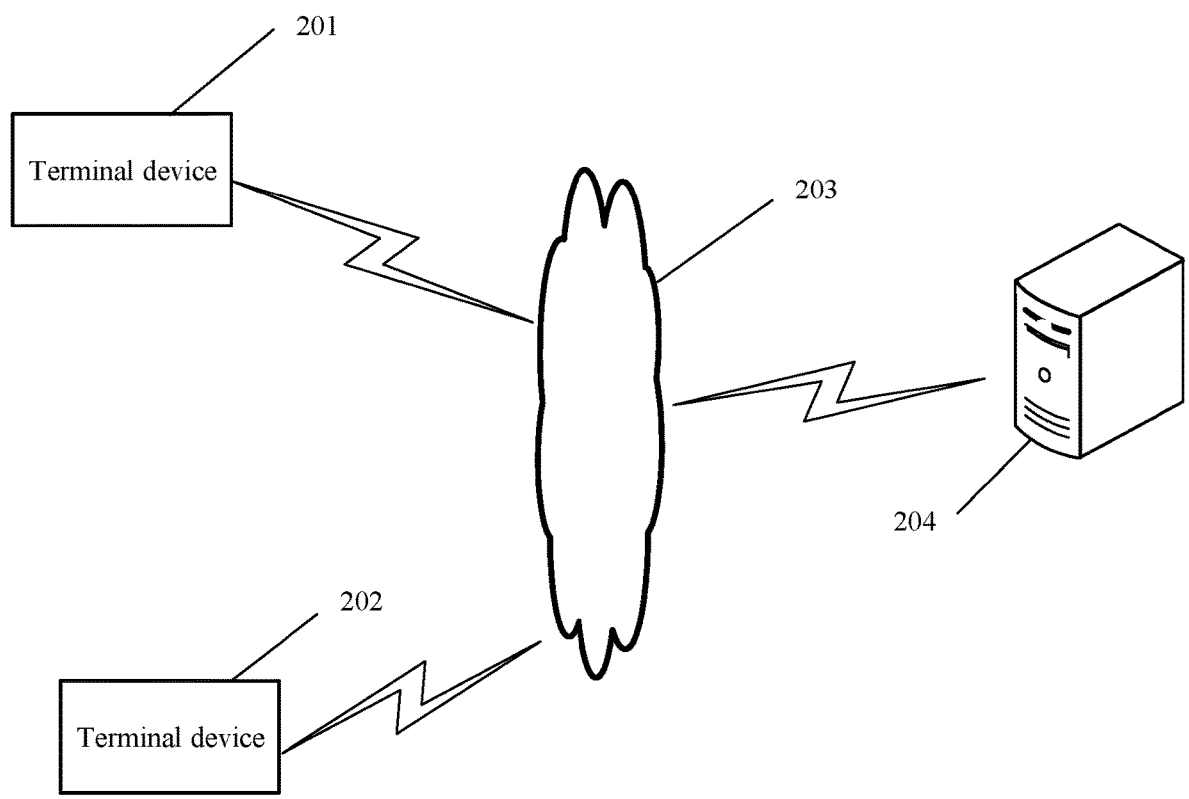
FIG. 2 is an exemplary system architecture of a speech recognition method or apparatus to which embodiments of the present invention are applicable.

FIG. 2 is an exemplary system architecture of a speech recognition method or apparatus to which embodiments of the present invention are applicable.

As shown in FIG. 2, the system architecture may include terminal devices 201 and 202, a network 203 and a server 204. The network 203 is a medium configured to provide communication links between the terminal devices 201 and 202 and the server 204. The network 203 may include a variety of connection types, such as wired, wireless communication links, or fiber-optic cables.

A user may interact with the server 204 through the network 203 by using the terminal devices 201 and 202. Various applications such as speech interaction applications, web browser applications, map applications, and communication applications, may be installed on the terminal devices 201 and 202.

The terminal devices 201 and 202 may be various electronic devices that support speech interaction, with or without a screen, including, but not limited to, smart phones, tablets, smart speakers, smart TVs, and so on. The apparatus for speech recognition according to the present invention may be arranged and run on the side of the terminal device 201 or 202, or arranged and run on the side of the server 204. The apparatus for speech recognition may be implemented as multiple software or software modules (for example, to provide distributed services) or as a single software or software module, which is not specifically limited herein.

For example, if the apparatus for speech recognition is arranged and runs on the side of the server 204, the user inputs a speech request through the terminal device 201, and the terminal device 201 sends the speech request to the server 204. The server 204 performs speech recognition in the manner according to an embodiment of the present disclosure to obtain a speech recognition result, and responds based on the speech recognition result. For example, the speech recognition result is returned to the terminal device 201 and displayed to the user. In another example, instructions included therein are executed according to the speech recognition result, and so on. In addition, the side of the server 204 may also be provided with an apparatus for training a speech recognition model according to an embodiment of the present disclosure to pre-train the speech recognition model to perform the speech recognition.

Figure 1:
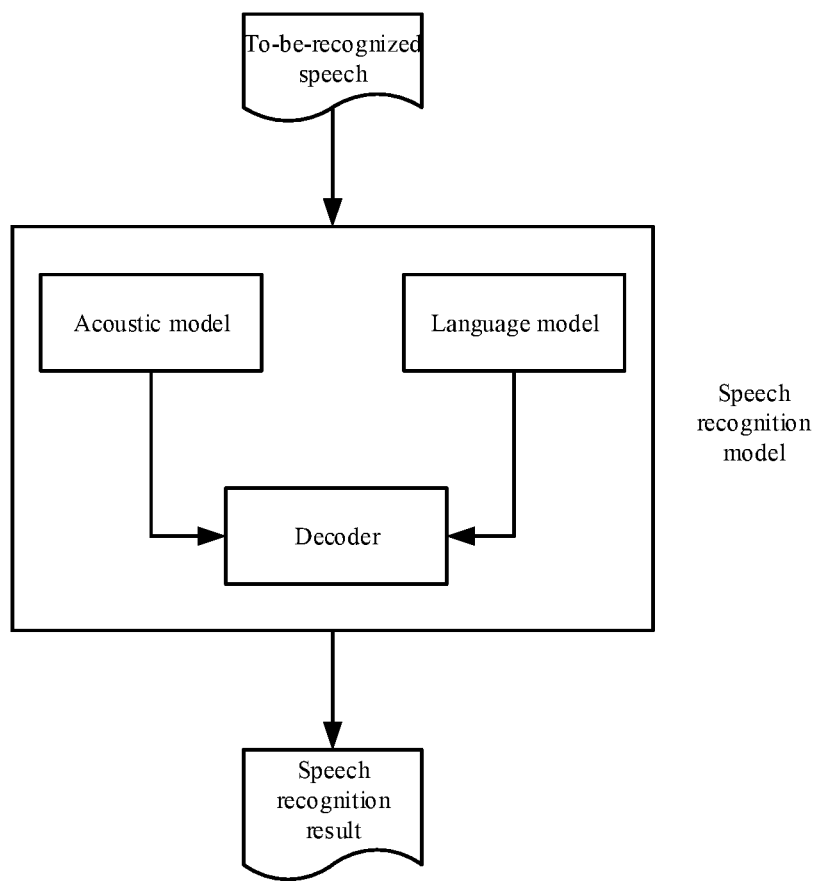
FIG. 1 is a schematic diagram of a speech recognition method in the prior art.

The server 204 may be a single server or a server group composed of multiple servers. It is to be understood that numbers of the terminal device, the network and the server in FIG. 1 are only illustrative. Any number of terminal devices, networks and servers may be available according to implementation requirements.

Figure 3:
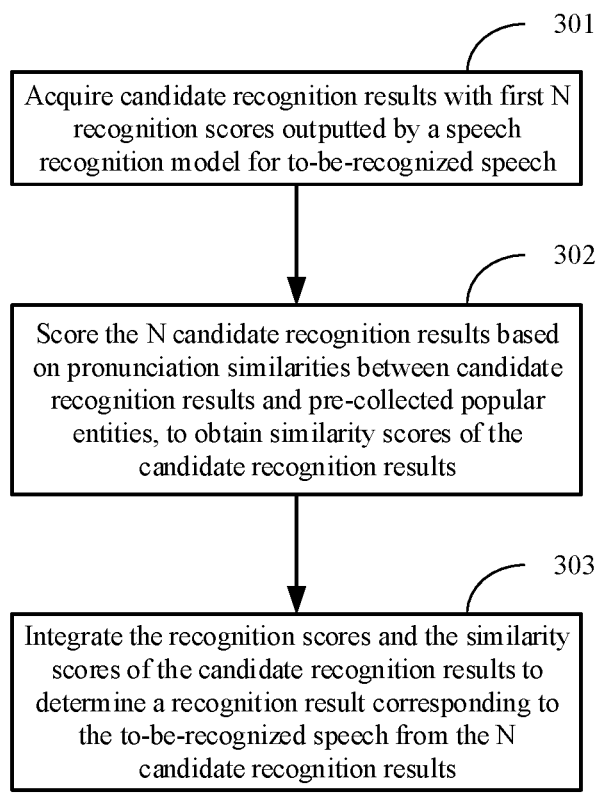
FIG. 3 is a flowchart of a method for speech recognition according to an embodiment of the present disclosure.

FIG. 3 is a flowchart of a method for speech recognition according to an embodiment of the present disclosure. The method is performed by an apparatus for speech recognition. The apparatus may be an application located on a server side or a functional unit in an application located on a server side such as a plug-in or a Software Development Kit (SDK), or located on a side of a terminal device with strong computing capability, which is not particularly limited herein in the embodiment of the present invention. As shown in FIG. 3, the method may include the following steps.

In step 301, candidate recognition results with first N recognition scores outputted by a speech recognition model for to-be-recognized speech are acquired, N being a positive integer greater than 1.

In step 302, the N candidate recognition results are scored based on pronunciation similarities between candidate recognition results and pre-collected popular entities, to obtain similarity scores of the candidate recognition results.

In step 303, the recognition scores and the similarity scores of the candidate recognition results are integrated to determine a recognition result corresponding to the to-be-recognized speech from the N candidate recognition results.

As can be seen from the embodiment shown in FIG. 3, on the basis of acquiring recognition scores of candidate recognition results from a speech recognition model, pronunciation similarities between candidate recognition results and pre-collected popular entities are integrated into scores of candidate results, and a final recognition result is determined by integrating the scores and entity scores, so that the final recognition result can be as similar as possible in pronunciation to the popular entities, so as to improve the recognition accuracy.

The method for speech recognition according to the present disclosure may be applied to a variety of fields. Correspondingly, the popular entities may be popular entities of a specific type corresponding to the fields. For example, in the field of map applications, the popular entities may be of a specific type such as points of interest (POIs) or locations. In another example, in the field of medical applications, the popular entities may be of a specific type such as diseases or drugs. In order to facilitate the understanding of the above method, the method is described by taking the field of map applications as an example in the following embodiments.

The steps in the above embodiment are described in detail below with reference to embodiments.

Firstly, in step 301, the present disclosure does not modify or affect the processing of the speech recognition model. The decoder still uses the acoustic model and the language model to acquire candidate recognition results and recognition scores of the candidate recognition results.

The candidate recognition results may be ranked according to the recognition scores, and first N candidate recognition results are selected. N is a positive integer greater than 1.

Such content is not changed in this embodiment, and thus is not described in detail herein.

For example, after the user inputs a speech request "Navigate to Gulou Dajie" including a location, due to the influence of user pronunciation, environment and other factors, recognition results of the decoder may not be accurate. For example, after the speech request is recognized by using the speech recognition model, recognition results with first 3 recognition scores are acquired: "Navigate to Gulong Dajie", "Navigate to Gulou Dajie" and "Navigate to Hulou Dajie". Thus, if the first recognition result is directly selected in a conventional implementation manner, the recognition result is not correct.

Step 302 "scoring the N candidate recognition results based on pronunciation similarities between candidate recognition results and pre-collected popular entities, to obtain similarity scores of the candidate recognition results" is described in detail below with reference to embodiments.

Firstly, a specific type of popular entities may be pre-collected in the embodiment of the present disclosure. At present, whether entities in various fields are popular is mostly judged based on traffic. Therefore, a specific type of entities may be counted based on traffic, so as to generate a popular entity list. The traffic may be traffic generated by users' on-site visits, or traffic generated by users' online visits or requests.

Taking locations in the field of map applications as an example, many popular locations may be counted first based on the traffic generated by users' on-site visits. For example, popular locations whose visitor traffic exceeds a preset visitor traffic threshold are counted based on visitor traffic, or popular locations whose visitor traffic ranks atop among preset numbers are counted. Furthermore, requests of each of the popular locations counted based on visitor traffic may also be counted, and popular locations whose request traffic exceeds a preset request traffic threshold are counted, or popular locations whose request traffic ranks atop among preset numbers are counted. The popular locations counted form a popular location list.

The above location-based statistics only takes traffic as a standard and does not require privacy information of any user, which can provide a basis for subsequent personalization based on "popular locations" on the premise of well protecting user privacy. Moreover, optimization of speech recognition in locations with heavy traffic is focused on, so that it is easier to meet requirements of a large number of users.

Taking the field of medical applications as an example, popular diseases or drugs whose traffic exceeds a preset traffic threshold may be obtained after statistics based on traffic (such as search volume, visitor volume and the number of occurrences of keywords in news), such as Lovastatin, Humira and Seretide.

Taking the field of entertainment applications as an example, popular programs, popular stars and popular events whose traffic exceeds a preset traffic threshold may be obtained after statistics based on traffic (such as search volume, visitor volume and the number of occurrences of keywords in news). For example, the above popular entities may be retrieved from daily, weekly and monthly ranking lists of entertainment hot words.

In addition, as one preferred implementation, the above popular entity list may be stored in a tree structure to obtain an entity resource tree. In the entity resource tree, nodes are words in the popular entities, and edges between the nodes are sequential relationships between the words. In addition, since the similarity scores of the candidate recognition results are based on pronunciation similarities in the present disclosure, pronunciation of each node is annotated on the entity resource tree.

Figure 4A:
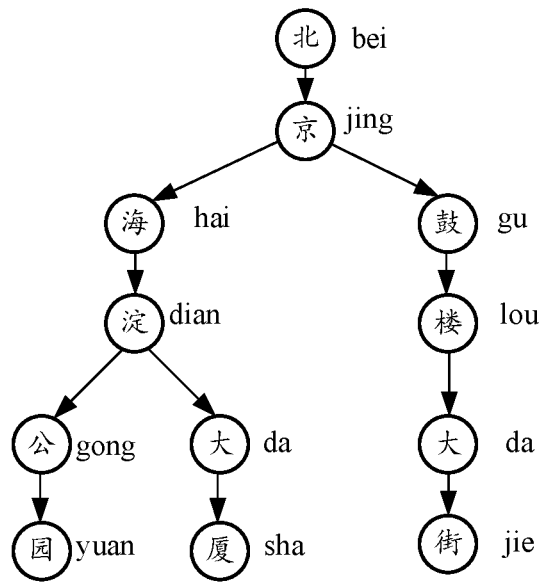
FIG. 4a is an instance diagram of an entity resource tree according to an embodiment of the present disclosure.

In a simple example, assuming that popular locations "Beijing Haidian Park", "Beijing Haidian Mansion" and "Beijing Gulou Dajie" exist in a popular location list, an entity resource tree formed may be shown in FIG. 4a. The pronunciation of each node in the entity resource tree is annotated in a form of pinyin. In addition to pinyin, other pronunciation annotating manners may also be adopted, which is not limited herein.

As can be seen from the above entity resource tree, entities with a same prefix are actually required to be stored for the same prefix only once. That is, the prefixes are merged, so as to save memory. Moreover, the tree structure can respond more quickly during the query matching.

The entity resource tree formed above may be applied to speech recognition of users within a preset range when loaded to a server side or cloud. For example, a location resource tree may be applied to speech recognition of users within a preset distance (for example, 5 km) from a corresponding location.

As a preferred implementation, when N candidate recognition results are scored, each candidate recognition result may be scored with the following two-level method.

The first level is to predict a similarity. The candidate recognition result is matched on an entity resource fuzzy tree. If the matching succeeds, the similarity score of the candidate recognition result may be directly determined as 0. If the matching fails, second-level scoring is continued.

The entity resource fuzzy tree is obtained by extending the entity resource tree. The extending manner is to extend and annotate similar pronunciations of the nodes on the entity resource tree. The similar pronunciations are extended mainly based on a preset rule. In fact, annotated pronunciations of the nodes are "blurred" so that slight differences may be allowed during the matching of similar pronunciations. The preset rule mainly includes extension of front and back nasal sounds, tone extension, vowel extension and so on.

Figure 4B:
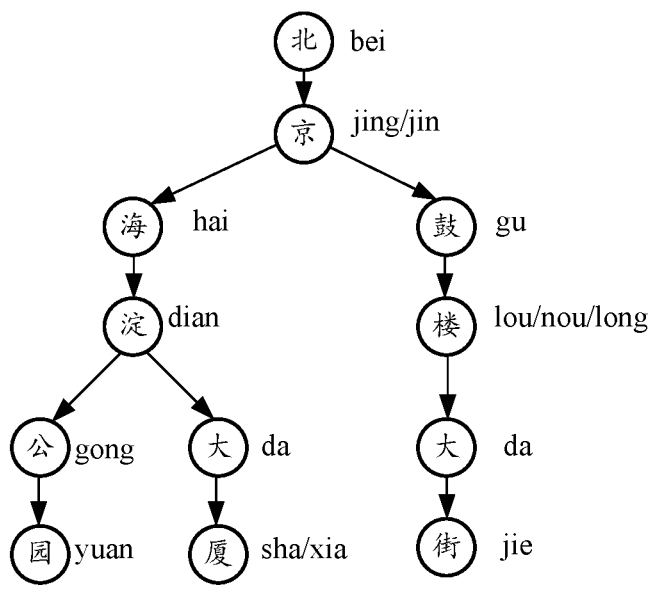
FIG. 4b is an instance diagram of an entity resource fuzzy tree according to an embodiment of the present disclosure.

Still referring to FIG. 4a, for example, some users may not be able to pronounce the front and back nasal sounds accurately, so the annotated pronunciation "jing" may be extended to "jin". In another example, some users may not be sure of the pronunciation of initial or final, such as "l" and "n", so the annotated pronunciation of "lou" may be extended to "nou". For example, "ou" and "ong" cannot be distinguished, so the annotated pronunciation of "lou" may be extended to "long". In another example, some users may differ in cognition of some characters. Many users may pronounce "sha" as "xia", so the annotated pronunciation of "sha" may be extended to "xia". In this way, the entity resource fuzzy tree shown in FIG. 4b is extended.

After candidate identification results, such as "Navigate to Gulong Dajie", "Navigate to Gulou Dajie" and "Navigate to Hulou Dajie", are matched on the entity resource fuzzy tree, "Navigate to Gulong Dajie" and "Navigate to Gulou Dajie" can be matched on the entity resource fuzzy tree according to their pronunciations, while "Navigate to Hulou Dajie" cannot be matched on the entity resource fuzzy tree according to its pronunciation. Therefore, the similarity score of "Navigate to Hulou Dajie" may be determined as 0, while "Navigate to Gulong Dajie" and "Navigate to Gulou Dajie" proceed to second-level scoring.

The second level is to perform scoring by using a similarity calculation model. Maximum values of the pronunciation similarities between the candidate recognition results and the matched popular entities are calculated by using the similarity calculation model, and the maximum values are taken as the similarity scores of the candidate recognition results.

Following the above example, second-level scoring is performed on the candidate recognition results of "Navigate to Gulong Dajie" and "Navigate to Gulou Dajie" respectively.

For example, it is assumed that "Navigate to Gulou Dajie" matches two popular entities on the entity resource fuzzy tree, that is, "Gulou Dajie" and "Hulu Dajie". Pronunciation similarities between the candidate recognition results and the two matched popular entities are calculated by using the similarity calculation model. The pronunciation similarity between "Navigate to Gulou Dajie" and "Gulou Dajie" is 100%, while the pronunciation similarity between "Navigate to Gulou Dajie" and "Hulu Dajie" is 60%, so a similarity score of the candidate recognition result "Navigate to Gulou Dajie" is determined as 100 points (a percentage system is assumed) according to the maximum value of 100%. A similarity score of "Navigate to Gulong Dajie" may also be determined in the same manner.

The similarity calculation model actually calculates pronunciation similarities accurately. The similarity calculation model is common to all popular entities.

The similarity calculation model may be any model that can calculate a pronunciation similarity between two texts. A pronunciation similarity score may also be pre-annotated for popular location pairs (including two popular locations) with similar and dissimilar pronunciations as training data to train the similarity calculation model.

Through the above two-level scoring mode, if the matching fails during the first-level similarity prediction, the subsequent scoring based on the similarity calculation model may not be performed, thereby reducing the number of calculations of the similarity calculation model. However, if only a one-level scoring mode is adopted, that is, the first-level scoring is not performed, and the second-level scoring based on the similarity calculation model is directly performed for each candidate recognition result, that is, maximum values of pronunciation similarities between candidate recognition results and popular entities are calculated directly by using the similarity calculation model, similarity scores of the candidate recognition results may also be determined based on the maximum values, which is far less efficient than the two-level scoring mode.

In addition, during the second-level scoring, only candidate recognition results through the first-level similarity prediction and several popular entities obtained by fuzzy matching during the first-level similarity prediction are required to be calculated. Therefore, an original process of similarity calculation between candidate recognition results and all the popular entities is simplified to a process of similarity calculation between candidate recognition results and the several popular entities, thereby greatly reducing the amount of calculation.

Step 303 "integrating the recognition scores and the similarity scores of the candidate recognition results to determine a recognition result corresponding to the to-be-recognized speech from the N candidate recognition results" is described in detail below.

In this step, the recognition scores and the similarity scores of the candidate recognition results may be weighted and summed, to obtain final scores of the N candidate recognition results, and then the recognition result corresponding to the to-be-recognized speech is determined by using the final scores.

Weights used in the above weighting and summing may be empirical values or experimental values.

When the recognition result corresponding to the to-be-recognized speech is determined by using the final scores, if only one recognition result is outputted, the candidate recognition result with the highest final score may be taken as the recognition result corresponding to the to-be-recognized speech. If N recognition results may be outputted, first M recognition results may be outputted in order of the final scores, where M≤N.

Following the above example, after scoring based on pronunciation similarities is performed on the recognition results with first 3 recognition scores obtained by the speech recognition model in step 301, that is, "Navigate to Gulong Dajie", "Navigate to Gulou Dajie" and "Navigate to Hulou Dajie", since "Navigate to Gulou Dajie" has the highest pronunciation similarity with the location "Gulou Dajie" in the popular location list, "Navigate to Gulou Dajie" has a significantly higher similarity score than "Navigate to Gulong Dajie" and "Navigate to Hulou Dajie". In this way, after the recognition scores and the similarity scores are weighted and summed, the final score of "Navigate to Gulou Dajie" may increase, thereby improving the accuracy of the final recognition result.

Figure 5:
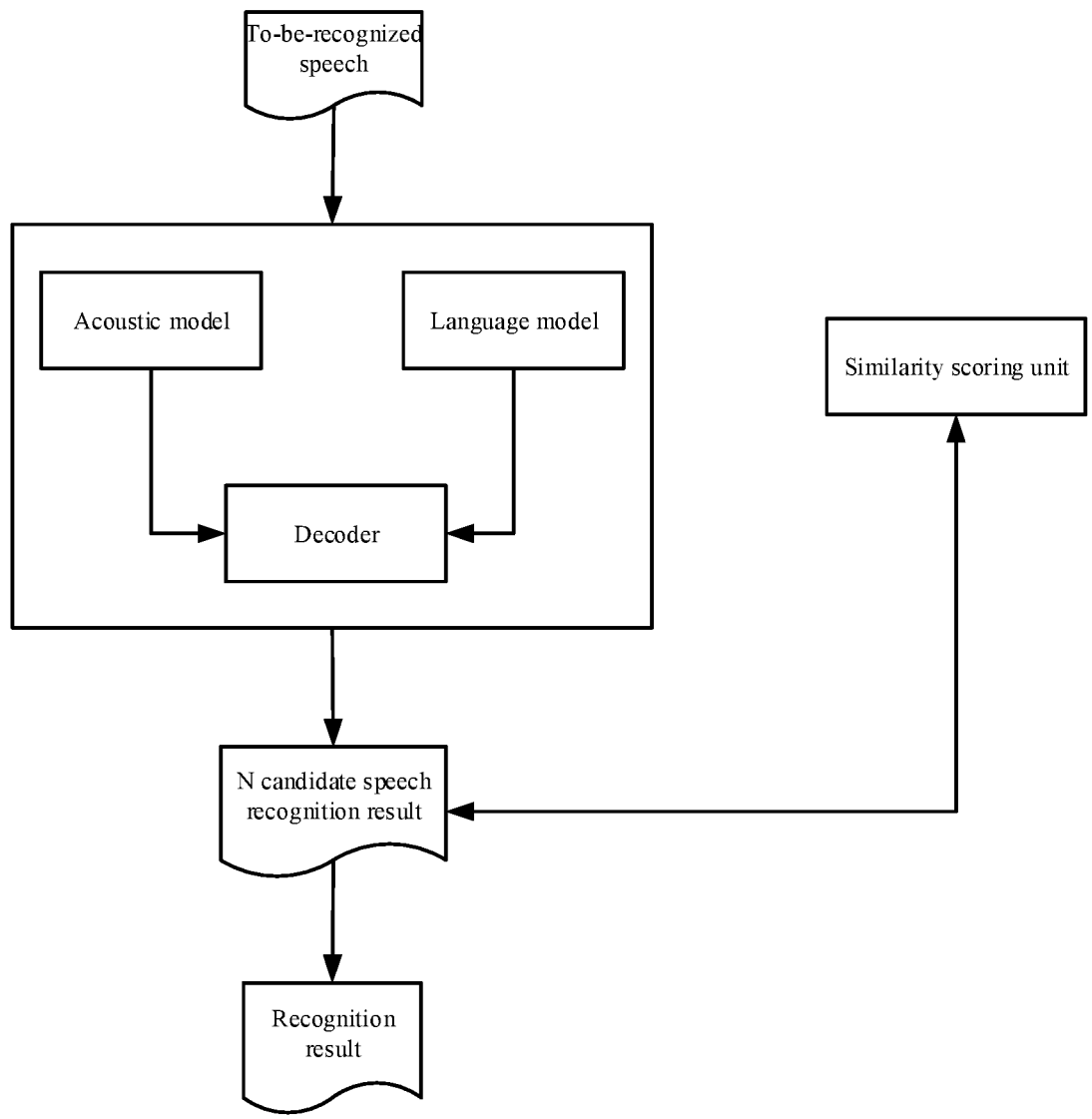
FIG. 5 is a schematic diagram of a method for speech recognition according to an embodiment of the present disclosure.

As shown in FIG. 5, a similarity scoring unit (configured to perform the scoring based on pronunciation similarities) does not interfere with the processing of the decoder during the speech recognition, but adjusts the final scores of the candidate recognition results outputted by the decoder.

The above is a detailed description of the method according to the present disclosure, and the following is a detailed description of the apparatus according to the present disclosure with reference to embodiments.

Figure 6:
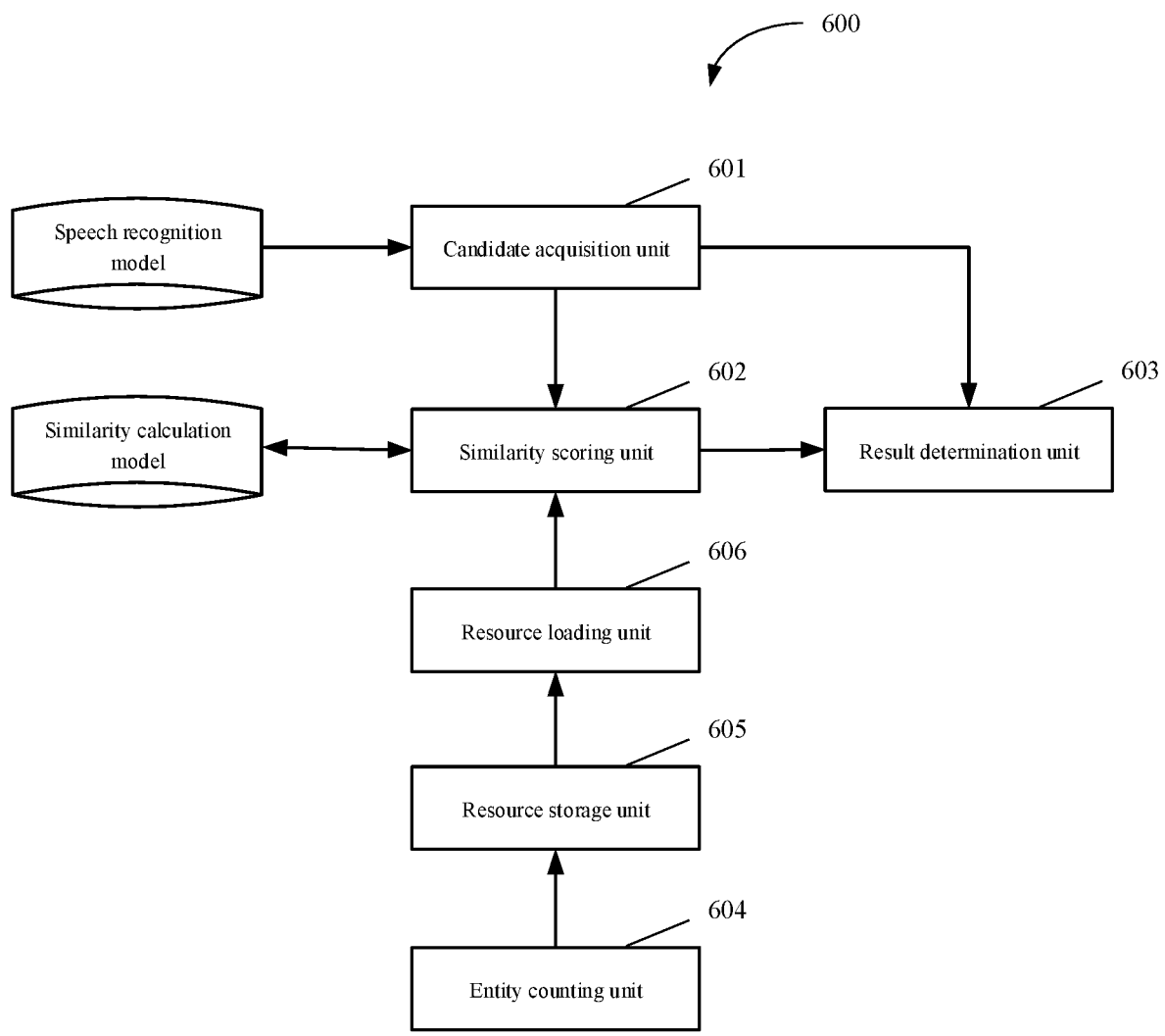
FIG. 6 is a structural diagram of an apparatus for speech recognition according to an embodiment of the present disclosure.

FIG. 6 is a structural diagram of an apparatus for speech recognition according to an embodiment of the present disclosure. As shown in FIG. 6, the apparatus 600 may include: a candidate acquisition unit 601, a similarity scoring unit 602 and a result determination unit 603, and may further include an entity counting unit 604, a resource storage unit 605 and a resource loading unit 606. Main functions of the component units are as follows.

The candidate acquisition unit 601 is configured to acquire candidate recognition results with first N recognition scores outputted by a speech recognition model for to-be-recognized speech, N being a positive integer greater than 1.

The similarity scoring unit 602 is configured to score the N candidate recognition results based on pronunciation similarities between candidate recognition results and pre-collected popular entities, to obtain similarity scores of the candidate recognition results.

The result determination unit 603 is configured to integrate the recognition scores and the similarity scores of the candidate recognition results to determine a recognition result corresponding to the to-be-recognized speech from the N candidate recognition results.

The entity counting unit 604 is configured to pre-count popular entities based on traffic and generate a popular entity list.

The resource storage unit 605 is configured to store the popular entity list in a tree structure to obtain an entity resource tree; wherein nodes in the entity resource tree are words in the popular entities, edges between the nodes are sequential relationships between the words, and pronunciation of each node is annotated on the entity resource tree.

The resource loading unit 606 is configured to load the entity resource tree and act on speech recognition of users within a preset range.

As one implementable manner, the similarity scoring unit 602 may perform the following operation respectively for the N candidate recognition results: calculating, by using a similarity calculation model, maximum values of the pronunciation similarities between the candidate recognition results and the popular entities, and taking the maximum values as the similarity scores of the candidate recognition results.

As one preferred implementation, the similarity scoring unit 602 may perform the following operation respectively for the N candidate recognition results:
 matching the candidate recognition results on an entity resource fuzzy tree; wherein the entity resource tree is obtained by extending and annotating similar pronunciations of the nodes on the entity resource fuzzy tree; and
 if the matching succeeds, calculating, by using a similarity calculation model, maximum values of the pronunciation similarities between the candidate recognition results and the matched popular entities, and determining the similarity scores of the candidate recognition results based on the maximum values; otherwise, determining the similarity scores of the candidate recognition results as 0.

As one implementable manner, the result determination unit 603 may weight and sum the recognition scores and the similarity scores of the candidate recognition results, to obtain final scores of the N candidate recognition results; and determine the recognition result corresponding to the to-be-recognized speech by using the final scores.

In a typical application scenario, the popular entities may include: popular POIs or popular locations counted based on traffic.

In addition, other scenarios, such as popular diseases and popular drugs in the field of medicines, popular events, popular stars and popular programs in the field of entertainment, and so on, may also apply.

Various embodiments in the specification are described progressively. Same and similar parts among the embodiments may be referred to one another, and each embodiment focuses on differences from other embodiments. In particular, the apparatus embodiments are basically similar to the method embodiments, so the description thereof is relatively simple. Related parts may be obtained with reference to the corresponding description in the method embodiments.

According to embodiments of the present disclosure, the present disclosure further provides an electronic device, a readable storage medium and a computer program product.

Figure 7:
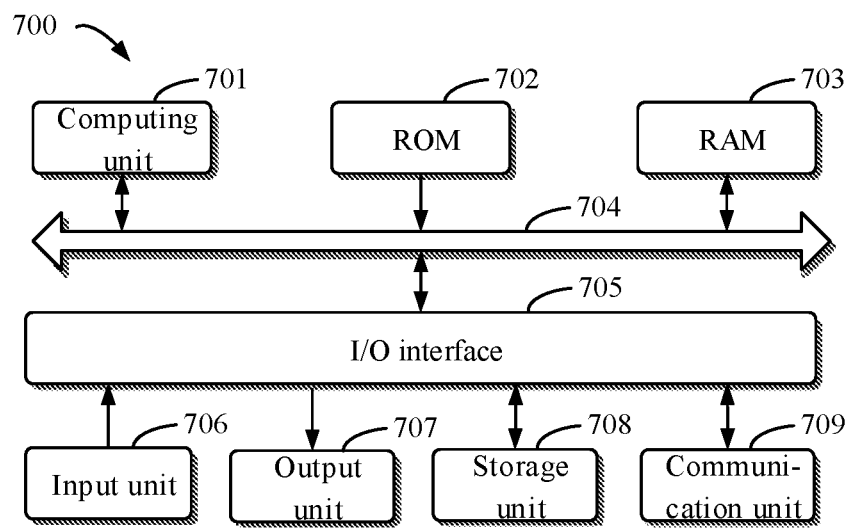
FIG. 7 is a block diagram of an electronic device configured to implement embodiments of the present disclosure.

FIG. 7 is a block diagram of an electronic device configured to perform a method for speech recognition or a method for training a speech recognition model according to embodiments of the present disclosure. The electronic device is intended to represent various forms of digital computers, such as laptops, desktops, workbenches, personal digital assistants, servers, blade servers, mainframe computers and other suitable computing devices. The electronic device may further represent various forms of mobile devices, such as personal digital assistants, cellular phones, smart phones, wearable devices and other similar computing devices. The components, their connections and relationships, and their functions shown herein are examples only, and are not intended to limit the implementation of the present disclosure as described and/or required herein.

As shown in FIG. 7, the device 700 includes a computing unit 701, which may perform various suitable actions and processing according to a computer program stored in a read-only memory (ROM) 702 or a computer program loaded from a storage unit 708 into a random access memory (RAM) 703. The RAM 703 may also store various programs and data required to operate the device 700. The computing unit 701, the ROM 702 and the RAM 703 are connected to one another by a bus 704. An input/output (I/O) interface 705 is also connected to the bus 704.

A plurality of components in the device 700 are connected to the I/O interface 705, including an input unit 706, such as a keyboard and a mouse; an output unit 707, such as various displays and speakers; a storage unit 708, such as disks and discs; and a communication unit 709, such as a network card, a modem and a wireless communication transceiver. The communication unit 709 allows the device 700 to exchange information/data with other devices over computer networks such as the Internet and/or various telecommunications networks.

The computing unit 701 may be a variety of general-purpose and/or special-purpose processing components with processing and computing capabilities. Some examples of the computing unit 701 include, but are not limited to, a central processing unit (CPU), a graphics processing unit (GPU), various artificial intelligence (AI) computing chips, various computing units that run machine learning model algorithms, a digital signal processor (DSP), and any appropriate processor, controller or microcontroller, etc. The computing unit 701 performs the methods and processing described above, such as the method for speech recognition or the method for training a speech recognition model. For example, in some embodiments, the method for speech recognition or the method for training a speech recognition model may be implemented as a computer software program that is tangibly embodied in a machine-readable medium, such as the storage unit 708.

In some embodiments, part or all of a computer program may be loaded and/or installed on the device 700 via the ROM 702 and/or the communication unit 709. One or more steps of the method for speech recognition or the method for training a speech recognition model described above may be performed when the computer program is loaded into the RAM 703 and executed by the computing unit 701. Alternatively, in other embodiments, the computing unit 701 may be configured to perform the method for speech recognition or the method for training a speech recognition model by any other appropriate means (for example, by means of firmware).

Various implementations of the systems and technologies disclosed herein can be realized in a digital electronic circuit system, an integrated circuit system, a field programmable gate array (FPGA), an application-specific integrated circuit (ASIC), an application-specific standard product (ASSP), a system on chip (SOC), a load programmable logic device (CPLD), computer hardware, firmware, software, and/or combinations thereof. Such implementations may include implementation in one or more computer programs that are executable and/or interpretable on a programmable system including at least one programmable processor, which can be special or general purpose, configured to receive data and instructions from a storage system, at least one input apparatus, and at least one output apparatus, and to transmit data and instructions to the storage system, the at least one input apparatus, and the at least one output apparatus.

Program codes configured to implement the methods in the present disclosure may be written in any combination of one or more programming languages. Such program codes may be supplied to a processor or controller of a general-purpose computer, a special-purpose computer, or another programmable data processing apparatus to enable the function/operation specified in the flowchart and/or block diagram to be implemented when the program codes are executed by the processor or controller. The program codes may be executed entirely on a machine, partially on a machine, partially on a machine and partially on a remote machine as a stand-alone package, or entirely on a remote machine or a server.

In the context of the present disclosure, machine-readable media may be tangible media which may include or store programs for use by or in conjunction with an instruction execution system, apparatus or device. The machine-readable media may be machine-readable signal media or machine-readable storage media. The machine-readable media may include, but are not limited to, electronic, magnetic, optical, electromagnetic, infrared, or semiconductor systems, apparatuses or devices, or any suitable combinations thereof. More specific examples of machine-readable storage media may include electrical connections based on one or more wires, a portable computer disk, a hard disk, a random access memory (RAM), a read-only memory (ROM), an erasable programmable read only memory (EPROM or flash memory), an optical fiber, a compact disk read only memory (CD-ROM), an optical storage device, a magnetic storage device, or any suitable combination thereof To provide interaction with a user, the systems and technologies described here can be implemented on a computer. The computer has: a display apparatus (e.g., a cathode-ray tube (CRT) or a liquid crystal display (LCD) monitor) for displaying information to the user; and a keyboard and a pointing apparatus (e.g., a mouse or trackball) through which the user may provide input for the computer. Other kinds of apparatuses may also be configured to provide interaction with the user. For example, a feedback provided for the user may be any form of sensory feedback (e.g., visual, auditory, or tactile feedback); and input from the user may be received in any form (including sound input, speech input, or tactile input).

The systems and technologies described herein can be implemented in a computing system including background components (e.g., as a data server), or a computing system including middleware components (e.g., an application server), or a computing system including front-end components (e.g., a user computer with a graphical user interface or web browser through which the user can interact with the implementation mode of the systems and technologies described here), or a computing system including any combination of such background components, middleware components or front-end components. The components of the system can be connected to each other through any form or medium of digital data communication (e.g., a communication network). Examples of the communication network include: a local area network (LAN), a wide area network (WAN) and the Internet.

The computer system may include a client and a server. The client and the server are generally far away from each other and generally interact via the communication network. A relationship between the client and the server is generated through computer programs that run on a corresponding computer and have a client-server relationship with each other. The server may be a cloud server, also known as a cloud computing server or cloud host, which is a host product in the cloud computing service system to solve the problems of difficult management and weak business scalability in the traditional physical host and a virtual private server (VPS). The server may also be a distributed system server, or a server combined with blockchain.

It should be understood that the steps can be reordered, added, or deleted using the various forms of processes shown above. For example, the steps described in the present application may be executed in parallel or sequentially or in different sequences, provided that desired results of the technical solutions disclosed in the present disclosure are achieved, which is not limited herein.

The above specific implementations do not limit the extent of protection of the present disclosure. Those skilled in the art should understand that various modifications, combinations, sub-combinations, and replacements can be made according to design requirements and other factors. Any modifications, equivalent substitutions and improvements made within the spirit and principle of the present disclosure all should be included in the extent of protection of the present disclosure.

What is claimed is:

1. A method for speech recognition, comprising:
acquiring candidate recognition results with first N recognition scores outputted by a speech recognition model for to-be-recognized speech, N being a positive integer greater than 1;
scoring the N candidate recognition results based on pronunciation similarities between candidate recognition results and pre-collected popular entities, to obtain similarity scores of the candidate recognition results; and
integrating the recognition scores and the similarity scores of the candidate recognition results to determine a recognition result corresponding to the to-be-recognized speech from the N candidate recognition results,
wherein the step of integrating the recognition scores and the similarity scores of the candidate recognition results to determine a recognition result corresponding to the to-be-recognized speech from the N candidate recognition results comprises:
weighting and summing the recognition scores and the similarity scores of the candidate recognition results, to obtain final scores of the N candidate recognition results; and
determining the recognition result corresponding to the to-be-recognized speech by using the final scores.

2. The method according to claim 1, wherein the popular entities comprise: popular points of interest (POIs) or popular locations counted based on traffic.

3. The method according to claim 1, further comprising:
pre-counting popular entities based on traffic, and generating a popular entity list.

4. The method according to claim 3, wherein the step of scoring the N candidate recognition results based on pronunciation similarities between candidate recognition results and pre-collected popular entities, to obtain similarity scores of the candidate recognition results comprises:
performing the following operation respectively for the N candidate recognition results: calculating, by using a similarity calculation model, maximum values of the pronunciation similarities between the candidate recognition results and the popular entities, and determining the similarity scores of the candidate recognition results based on the maximum values.

5. The method according to claim 3, wherein the popular entities comprise: popular points of interest (POIs) or popular locations counted based on traffic.

6. The method according to claim 3, further comprising:
storing the popular entity list in a tree structure to obtain an entity resource tree; wherein nodes in the entity resource tree are words in the popular entities, edges between the nodes are sequential relationships between the words, and pronunciation of each node is annotated on the entity resource tree.

7. The method according to claim 6, wherein the step of scoring the N candidate recognition results based on pronunciation similarities between candidate recognition results and pre-collected popular entities, to obtain similarity scores of the candidate recognition results comprises:
performing the following operation respectively for the N candidate recognition results: matching the candidate recognition results on an entity resource fuzzy tree; wherein the entity resource tree is obtained by extending and annotating similar pronunciations of the nodes on the entity resource fuzzy tree; and
if the matching succeeds, calculating, by using a similarity calculation model, maximum values of the pronunciation similarities between the candidate recognition results and the matched popular entities, and determining the similarity scores of the candidate recognition results based on the maximum values; otherwise, determining the similarity scores of the candidate recognition results as 0.

8. The method according to claim 6, wherein the popular entities comprise: popular points of interest (POIs) or popular locations counted based on traffic.

9. The method according to claim 6, further comprising: loading the entity resource tree and acting on speech recognition of users within a preset range.

10. The method according to claim 9, wherein the popular entities comprise: popular points of interest (POIs) or popular locations counted based on traffic.

11. An electronic device, comprising:
at least one processor; and
a memory communicatively connected with the at least one processor;
wherein the memory stores instructions executable by the at least one processor, and the instructions are executed by the at least one processor to enable the at least one processor to perform a method for speech recognition, wherein the method comprises:
acquiring candidate recognition results with first N recognition scores outputted by a speech recognition model for to-be-recognized speech, N being a positive integer greater than 1;
scoring the N candidate recognition results based on pronunciation similarities between candidate recognition results and pre-collected popular entities, to obtain similarity scores of the candidate recognition results; and
integrating the recognition scores and the similarity scores of the candidate recognition results to determine a recognition result corresponding to the to-be-recognized speech from the N candidate recognition results,
wherein the step of integrating the recognition scores and the similarity scores of the candidate recognition results to determine a recognition result corresponding to the to-be-recognized speech from the N candidate recognition results comprises: weighting and summing the recognition scores and the similarity scores of the candidate recognition results, to obtain final scores of the N candidate recognition results; and determining the recognition result corresponding to the to-be-recognized speech by using the final scores.

12. The electronic device according to claim 11, wherein the popular entities comprise: popular POIs or popular locations counted based on traffic.

13. The electronic device according to claim 11, further comprising:
pre-counting popular entities based on traffic, and generating a popular entity list.

14. The electronic device according to claim 13, further comprising:
loading the entity resource tree and acting on speech recognition of users within a preset range.

15. The electronic device according to claim 13, wherein the step of scoring the N candidate recognition results based on pronunciation similarities between candidate recognition results and pre-collected popular entities, to obtain similarity scores of the candidate recognition results comprises:
performing the following operation respectively for the N candidate recognition results: calculating, by using a similarity calculation model, maximum values of the pronunciation similarities between the candidate recognition results and the popular entities, and determining the similarity scores of the candidate recognition results based on the maximum values.

16. The electronic device according to claim 13, further comprising:
storing the popular entity list in a tree structure to obtain an entity resource tree; wherein nodes in the entity resource tree are words in the popular entities, edges between the nodes are sequential relationships between the words, and pronunciation of each node is annotated on the entity resource tree.

17. The electronic device according to claim 16, wherein the step of scoring the N candidate recognition results based on pronunciation similarities between candidate recognition results and pre-collected popular entities, to obtain similarity scores of the candidate recognition results comprises:
performing the following operation respectively for the N candidate recognition results: matching the candidate recognition results on an entity resource fuzzy tree; wherein the entity resource tree is obtained by extending and annotating similar pronunciations of the nodes on the entity resource fuzzy tree; and
if the matching succeeds, calculating, by using a similarity calculation model, maximum values of the pronunciation similarities between the candidate recognition results and the matched popular entities, and determining the similarity scores of the candidate recognition results based on the maximum values; otherwise, determining the similarity scores of the candidate recognition results as 0.

18. A non-transitory computer readable storage medium with computer instructions stored thereon, wherein the computer instructions are used for causing a computer to perform a method for speech recognition, wherein the method comprises:
acquiring candidate recognition results with first N recognition scores outputted by a speech recognition model for to-be-recognized speech, N being a positive integer greater than 1;
scoring the N candidate recognition results based on pronunciation similarities between candidate recognition results and pre-collected popular entities, to obtain similarity scores of the candidate recognition results; and
integrating the recognition scores and the similarity scores of the candidate recognition results to determine a recognition result corresponding to the to-be-recognized speech from the N candidate recognition results,
wherein the step of integrating the recognition scores and the similarity scores of the candidate recognition results to determine a recognition result corresponding to the to-be-recognized speech from the N candidate recognition results comprises:
weighting and summing the recognition scores and the similarity scores of the candidate recognition results, to obtain final scores of the N candidate recognition results; and
determining the recognition result corresponding to the to-be-recognized speech by using the final scores.

* * * * *